United States Patent
Fuwa

(10) Patent No.: US 11,999,145 B2
(45) Date of Patent: Jun. 4, 2024

(54) SEAT SKIN, AND METHOD FOR PRODUCING SEAT SKIN

(71) Applicant: SEIREN CO., LTD., Fukui (JP)

(72) Inventor: Naozumi Fuwa, Fukui (JP)

(73) Assignee: SEIREN CO., LTD., Fukui (JP)

( * ) Notice: Subject to any disclaimer, the term of this patent is extended or adjusted under 35 U.S.C. 154(b) by 0 days.

(21) Appl. No.: 17/755,833

(22) PCT Filed: Oct. 16, 2020

(86) PCT No.: PCT/JP2020/039038
§ 371 (c)(1),
(2) Date: May 10, 2022

(87) PCT Pub. No.: WO2021/100375
PCT Pub. Date: May 27, 2021

(65) Prior Publication Data
US 2022/0379580 A1    Dec. 1, 2022

(30) Foreign Application Priority Data
Nov. 18, 2019    (JP) .................................. 2019-207676

(51) Int. Cl.
| | | |
|---|---|---|
| B32B 3/24 | (2006.01) |
| A47C 31/02 | (2006.01) |
| B29C 59/02 | (2006.01) |
| B32B 3/26 | (2006.01) |
| B32B 27/40 | (2006.01) |
| B60N 2/58 | (2006.01) |

(52) U.S. Cl.
CPC .............. *B32B 3/266* (2013.01); *A47C 31/02* (2013.01); *B29C 59/02* (2013.01); *B32B 27/40* (2013.01); *B60N 2/58* (2013.01)

(58) Field of Classification Search
CPC ...................................................... B32B 3/266
USPC ......................................................... 428/137
See application file for complete search history.

(56) References Cited

U.S. PATENT DOCUMENTS

2014/0260438 A1* 9/2014 Matsumura .............. B26D 7/02
69/21

FOREIGN PATENT DOCUMENTS

| | | |
|---|---|---|
| JP | 2010-125842 A | 6/2010 |
| JP | 2017-213865 A | 12/2017 |

(Continued)

OTHER PUBLICATIONS

International Search Report issued in Patent Application No. PCT/JP2020/039038 dated Dec. 15, 2020.

*Primary Examiner* — William P Watkins, III
(74) *Attorney, Agent, or Firm* — PEARNE & GORDON LLP

(57) ABSTRACT

A seat skin 11 has a front surface layer 12, a back surface layer 13, and pores 15. The inner wall of the pore 15 is covered by the front surface layer 12. The seat skin 11 is produced by forming a base material having at least a front surface layer 12 and a back surface layer 13; sandwiching the base material between a pressing plate having a die for the pores, and a backing plate opposite the pressing plate; pressing the pressing plate against the backing plate with the base material being heated at a temperature that a component contained in the front surface layer 12 does not melt, to form the pores in the base material; and removing the base material having the pores formed therein from between the pressing plate and the backing plate.

7 Claims, 8 Drawing Sheets

(56) References Cited

FOREIGN PATENT DOCUMENTS

| | | |
|---|---|---|
| JP | 2017-222962 A | 12/2017 |
| JP | 2019-112737 A | 7/2019 |
| WO | 2017/006556 A1 | 1/2017 |

* cited by examiner

FIG. 2(a')

SEAT SKIN, AND METHOD FOR PRODUCING SEAT SKIN

TECHNICAL FIELD

The present invention relates to a seat skin that has a front surface layer, a back surface layer, and pores, and a method for producing the seat skin.

BACKGROUND ART

Some types of known artificial leather have recessed pores or through pores for reducing a stuffy or wet feeling in use (see, for example, Patent Document 1).

CITATION LIST

Patent Literature

Patent Document 1: Japanese Unexamined Patent Application Publication No. 2017-222962

Patent Document 1 discloses an artificial leather in which a thermoplastic resin is provided to a cloth made of thermoplastic synthetic fibers. In such an artificial leather, recessed pores or through pores are formed by irradiating the surface of the artificial leather with laser beams using a laser beam emission device, and thereby heating the thermoplastic synthetic fibers and the thermoplastic resin with the laser beams.

SUMMARY OF INVENTION

Technical Problem

The inner wall of the recessed pore or through pore formed in the artificial leather of Patent Document 1 is covered by a thermally-melted material made from the thermoplastic synthetic fibers and thermoplastic resin heated and melted by the laser beams. Therefore, the front surface layer around the recessed pore or through pore and the inner wall of the recessed pore or through pore have different textures, which is not preferable in terms of design properties.

With the above problem in mind, the present invention has been made. It is an object of the present invention to provide a seat skin that has the function of reducing a stuffy feeling when used as a skin of a seat, and has good design properties, and a method for producing the seat skin.

Solution to Problem

To solve the problem described above, a seat skin according to the present invention is characterized in that the seat skin comprises: a front surface layer; a back surface layer; and pores, and an inner wall of the pore is covered by the front surface layer.

With the seat skin thus configured, a stuffy feeling can be reduced by the pores provided in the seat skin when the seat skin is used as a skin of a seat. In addition, with the seat skin thus configured, the inner wall of the pore is covered by the front surface layer itself. Therefore, the front surface layer around the pore and the inner wall of the pore can have the same texture, and in addition, the portion at which the pore is provided can provide depth as a design feature, resulting in good design properties.

In the seat skin of the present invention, the pore is preferably a through pore, and an opening peripheral portion of the through pore in the back surface layer is preferably formed of a fused product of a component contained in the front surface layer and/or the back surface layer.

With the seat skin thus configured, the pore is a through pore, and an opening peripheral portion of the through pore in the back surface layer is formed of a fused product of a component contained in the front surface layer and/or the back surface layer. Therefore, excellent air permeability is provided by the through pores, and excellent durability is provided by firm bonding of the opening peripheral portion of the through pore by the fused product.

In the seat skin of the present invention, the pore is preferably a recessed pore, and a bottom surface of the recessed pore is preferably formed at a position deeper than that of a connection surface of the back surface layer.

With the seat skin thus configured, the pore is a recessed pore, and a bottom surface of the recessed pore is formed at a position deeper than that of a connection surface of the back surface layer. Therefore, the seat skin is soft and flexible and therefore has good texture, and is easy to fit the body.

In the seat skin of the present invention, a pore diameter of the pore preferably varies according to depth.

With the seat skin thus configured, a pore diameter of the pore varies according to depth. Therefore, varied design can be provided.

In the seat skin of the present invention, an intermediate layer is preferably provided between the front surface layer and the back surface layer.

With the seat skin thus configured, an intermediate layer is provided between the front surface layer and the back surface layer. Therefore, strength and durability are improved by the intermediate layer, and a heavy and thick feeling can be imparted to the entire skin.

In the seat skin of the present invention, the back surface layer preferably includes a cushioning material.

With the seat skin thus configured, the back surface layer includes a cushioning material. Therefore, flexibility can be improved, and it is easier to form pores whose pore diameter gradually becomes narrower from the front surface layer toward the back surface layer.

In the seat skin of the present invention, a back cloth is preferably provided on a lower surface of the back surface layer.

With the seat skin thus configured, a back cloth is provided on a lower surface of the back surface layer. Therefore, damage to the back surface layer can be prevented during formation of the pores.

In the seat skin of the present invention, the front surface layer and the back surface layer preferably simultaneously or independently contain at least one resin selected from the group consisting of polyester resins, polyamide resins, polyacrylic resins, polyolefin resins, polyvinyl chloride resins, and polyurethane resins.

With the seat skin thus configured, the front surface layer and the back surface layer contain the resins described above. Therefore, the inner wall of the pore is covered by the front surface layer itself, and in addition, a fused product formed at the pore is a mixture of resins, and the strength thereof can be maintained.

Next, a method for producing a seat skin according to the present invention is characterized in that:

the method is for producing a seat skin having pores, and comprises:

a base material formation step of forming a base material having at least a front and a back surface layer;

a sandwiching step of sandwiching the base material between a pressing plate having a die for the pores, and a backing plate opposite the pressing plate;

a pressing step of pressing the pressing plate against the backing plate with the base material being heated at a temperature that a component contained in the front surface layer does not melt, to form the pores in the base material; and a discharging step of removing the base material having the pores formed therein from between the pressing plate and the backing plate.

With the seat skin production method thus configured, a base material having at least a front and a back surface layer, which is formed by a base material formation step, is subjected to a sandwiching step of sandwiching the base material between a pressing plate having a die for the pores, and a backing plate opposite the pressing plate, a pressing step of pressing the pressing plate against the backing plate with the base material being heated at a temperature that a component contained in the front surface layer does not melt, to form the pores in the base material, is performed, and thereafter, a discharging step of removing the base material having the pores formed therein from between the pressing plate and the backing plate, is performed, to form the seat skin. With the seat skin thus produced, a stuffy feeling can be reduced by the pores provided in the seat skin when the seat skin is used as a skin of a seat. In addition, with the seat skin produced by the seat skin production method thus configured, the inner wall of the pore is covered by the front surface layer itself. Therefore, the front surface layer around the pore and the inner wall of the pore can have the same texture, and in addition, the portion at which the pore is provided can provide depth as a design feature, resulting in good design properties.

In the seat skin production method of the present invention, in the sandwiching step, a protective sheet is preferably inserted between the base material and the backing plate.

With the seat skin production method thus configured, a protective sheet is inserted between the base material and the backing plate. Therefore, damage to the die for pores can be prevented.

BRIEF DESCRIPTION OF DRAWINGS

FIG. 2 is a diagram for describing a method for producing the seat skin of the first embodiment of the present invention. FIG. 2(a') is a diagram illustrating another example of the base material formation step.

FIG. 6 is a cross-sectional view schematically illustrating a multilayer structure of a seat skin according to a fifth embodiment of the present invention.

FIG. 7 is a cross-sectional view schematically illustrating a multilayer structure of a seat skin according to a sixth embodiment of the present invention.

DESCRIPTION OF EMBODIMENTS

Figure 1:
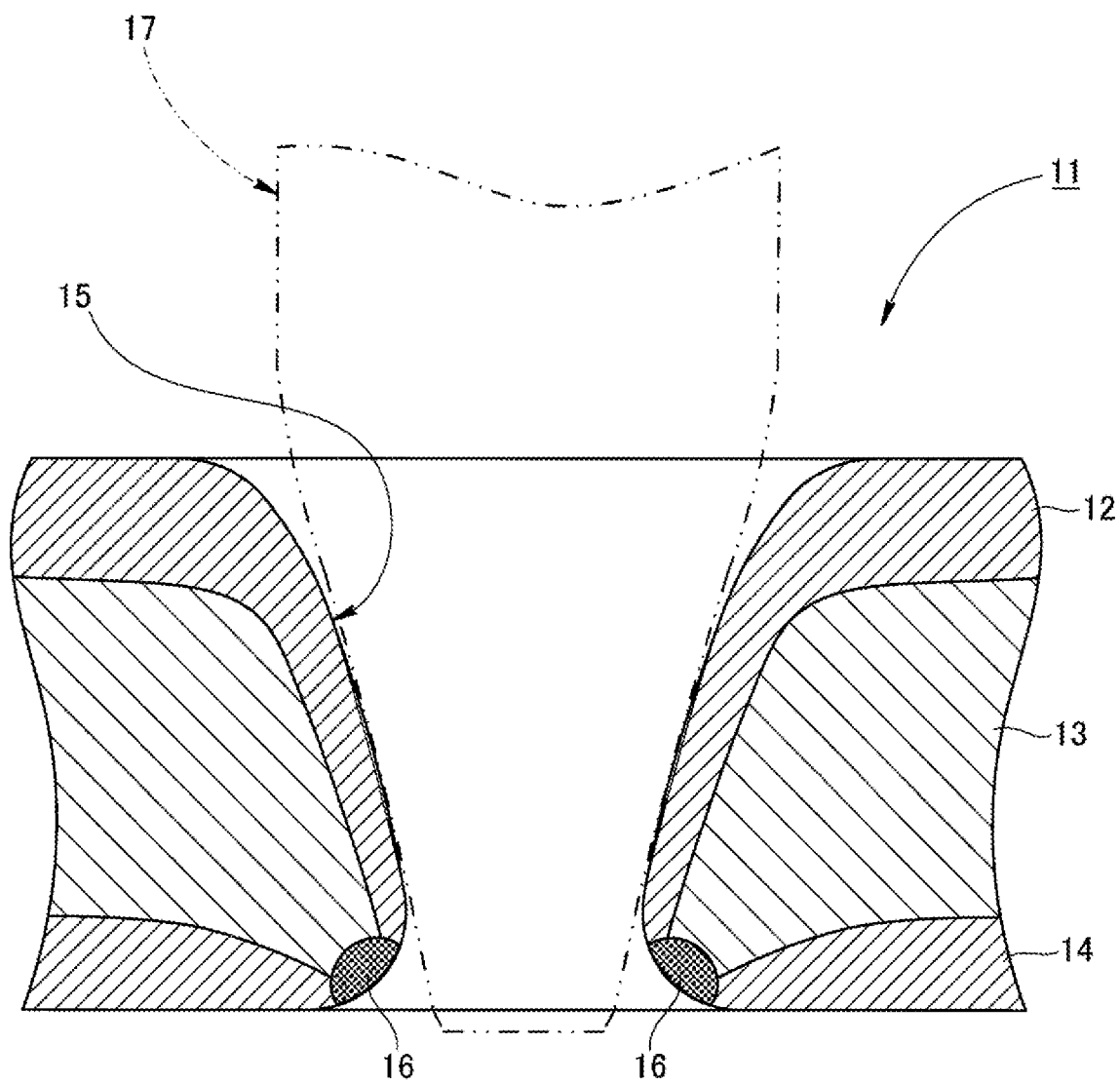
FIG. 1 is a cross-sectional view schematically illustrating a multilayer structure of a seat skin according to a first embodiment of the present invention.

The present invention will be described below with reference to FIGS. 1-8. Note that the present invention is not intended to be limited to the embodiments below or the configurations illustrated in the accompanying drawing. Note that in the drawings, the thicknesses of layers and the dimensions of components, and the like, in a multilayer structure of a seat skin are not to scale, and are exaggerated, as appropriate, for the sake of simplicity.

First Embodiment

<Overall Configuration>

FIG. 1 is a cross-sectional view schematically illustrating a multilayer structure of a seat skin according to a first embodiment of the present invention. As illustrated in FIG. 1, the seat skin 11 of the first embodiment has a front surface layer 12, a back surface layer 13, and a back cloth 14. Through pores 15 (corresponding to "pores" according to the present invention) are formed, extending from the front surface layer 12 toward the back surface layer 13. Although the back cloth 14 is preferably provided, the back cloth 14 may be removed.

<Front Surface Layer>

The front surface layer 12 may be made of, for example, a cloth, such as woven fabric, knitted fabric, or nonwoven fabric, or a leather, such as artificial leather, synthetic leather, or natural leather.

The material for the front surface layer 12 is not particularly limited. Given the means for forming the through pores 15, the material preferably contains a thermoplastic resin as a component. The form of the thermoplastic resin is not particularly limited. A cloth made of thermoplastic fibers may be used. Alternatively, a leather impregnated with a thermoplastic resin or a leather laminated with a thermoplastic resin may be used.

In the case where the front surface layer 12 is made of a cloth, such as woven fabric, knitted fabric, or nonwoven fabric, or a leather, such as artificial leather, synthetic leather, or natural leather, examples of the material for fibers (monofilaments) constituting yarns of the cloth, such as woven fabric, knitted fabric, or nonwoven fabric, the base material for the artificial leather and synthetic leather, and a back cloth for the synthetic leather, include, but are not limited to, natural fibers, regenerated fibers, semisynthetic fibers, and synthetic fibers. Of them, synthetic fibers are preferable in terms of durability, particularly mechanical strength, heat resistance, and light resistance. Of synthetic fibers, polyesters are particularly preferable. Polyethylene terephthalate, or composite fiber containing polyethylene terephthalate as a component, is more preferable. Note that examples of the texture of woven fabric include, but are not limited to, three basic weaves, i.e., plain, twill, and sateen, modifications of these three basic weaves, special weaves such as crepe, and mixed weaves that are a combination thereof.

In the case where the front surface layer 12 is made of a knitted fabric, examples of the knitted fabric include, but are not limited to, weft-knitted fabrics, such as circular knit and weft knit, and warp-knitted fabrics, such as tricot knit, raschel knit, and Milanese knit.

In the case where the front surface layer 12 is made of a nonwoven fabric, the nonwoven fabric is preferably one that is obtained by stacking and bonding long fiber filaments or short fibers (staple) of a synthetic resin, such as a polyester, polyamide, polyacrylate, or polyolefin, with a high density and in random directions. These synthetic resins may contain a water repellent, heat-resistance improver, antioxidant, flame retardant, and the like.

In the case where the front surface layer 12 is made of an artificial leather, the artificial leather may, for example, be one that is obtained by impregnating a base cloth made of a nonwoven fabric, woven fabric, or knitted fabric with a synthetic resin (a polyvinyl chloride resin, a polyurethane resin, etc.) solution, and subjecting the cloth to a finishing process such as napping or embossing so that the cloth mimics suede or nubuck leather or the like.

In the case where the front surface layer 12 is made of a synthetic leather, the synthetic leather may, for example, be one that is obtained by laminating a synthetic resin (a polyvinyl chloride resin, a polyurethane resin, etc.) on a base cloth made of, for example, a woven fabric, knitted fabric, nonwoven fabric, or the like, and subjecting the cloth to a finishing process such as embossing or crumpling so that the cloth mimics leather. Note that the synthetic leather may be formed by either a wet method or a dry method.

In the case where the front surface layer 12 is made of a natural leather, the natural leather may be one that is known, such as leather from mammals such as cattle, horses, pigs, goats, sheep, deer, and kangaroos, leather from birds such as ostriches, and leather from reptiles such as sea turtles, monitor lizards, pythons, and alligators. Of them, leather from cattle is preferable because of its high versatility, large area, and great thickness. Animal hides (raw hides) may be preferably tanned to acquire durability (heat resistance, decay resistance, chemical resistance, etc.), and subjected to treatments for improving inherent characteristics of "natural leather." The animal hides thus treated by known leather-making processes (tanning, staining, and finishing) are preferably used.

The thickness of the front surface layer 12 is not particularly limited, and is preferably at most 20 mm because the through pores 15 can be easily formed. The thickness of the front surface layer 12 is preferably at least 0.3 mm because the through pores 15 that gradually become narrower from the front surface layer 12 toward the back surface layer 13 can be easily formed.

<Back Surface Layer>

The back surface layer 13 can be made of a material similar to that for the front surface layer 12. The back surface layer 13 may also, for example, be made of a cushioning material. The back surface layer 13 that is made of a cushioning material provides an improved feeling of seating comfort and feeling of touch.

The method of integrating the cushioning material (the back surface layer 13) with the front surface layer 12 is not particularly limited, and may, for example, be carried out by using an adhesive or by flame lamination. Flame lamination is preferable in terms of process load and weight reduction. In the case where the front surface layer 12 and the back surface layer 13 are integrated into a multilayer sheet, the thickness of the multilayer sheet is preferably 1.3-30 mm. In the case where the back surface layer 13 is made of a cushioning material in the multilayer sheet, the thickness of the cushioning material is preferably 1.0-10 mm.

The material for the cushioning material is not particularly limited, and may be a synthetic resin foam, such as polyurethane foam, a cloth, such as three-dimensional woven fabric, three-dimensional knitted fabric, and nonwoven fabric, or the like. Synthetic resin foam is preferable because it is easy to form the through pores 15 that gradually become narrower from the front surface layer 12 toward the back surface layer 13. Polyurethane foam sheets are preferable in terms of versatility.

The resin used in the front surface layer 12 and the resin used in the back surface layer 13 may be the same or may be independent and different from each other. In the case where an appropriate resin(s) is used in the front surface layer 12 and the back surface layer 13, the inner wall of the through pore 15 described below is covered by the front surface layer 12 itself, and a fused product 16 formed at an opening peripheral portion of the through pore 15 is a mixture of resins, and the strength thereof can be maintained.

<Back Cloth>

The back cloth 14 is preferably provided on a lower surface of the back surface layer 13 in order to, for example, prevent damage to the back surface layer 13 (cushioning material) during formation of the through pores 15. The back cloth 14 is not particularly limited, and may, for example, be a cloth made of synthetic fibers such as a polyester. It is also preferable to use a cloth made of fibers having a low melting point because punching pieces or scraps from the multilayer sheet can be efficiently removed during formation of the through pores 15. Note that the surface of the back surface layer 13 that is in contact with the front surface layer 12 is the upper surface of the back surface layer 13, and the opposite surface of the back surface layer 13 from the surface of the back surface layer 13 that is in contact with the front surface layer 12 is the lower surface of the back surface layer 13.

<Through Pores>

The through pore 15 gradually becomes narrower from the front surface layer 12 toward the back surface layer 13. That is, the pore diameter of the through pore 15 varies according to depth. The through pore 15 thus provides depth as a design feature, resulting in an improvement in design properties.

The inner wall of the through pore 15 is covered by the front surface layer 12 itself. Specifically, unlike the artificial leather of Patent Document 1 in which the inner wall of the through pore is covered by a thermally-melted material, the inner wall of the through pore 15 is covered only by the front surface layer 12. The opening peripheral portion of the through pore 15 in the back surface layer 13 is formed of the fused product 16 of a component contained in at least one (in this example, all of three) of the front surface layer 12, the back surface layer 13, and the back cloth 14. Thus, in addition to excellent air permeability provided by the through pores 15, the firm bonding of the opening peripheral portion of the through pore 15 by the fused product reduces the occurrence of unravelling at the opening peripheral portion, resulting in excellent durability of the seat skin 11.

The method of forming the through pores 15 is not particularly limited, and may be any method in which a die portion 17 described below (corresponding to a "die for pores" of the present invention) that is pressed from the front surface layer 12 toward the back surface layer 13 to form the through pores 15 is used to be pressed from the front surface layer 12 toward the back surface layer 13, so that the opening peripheral portion of the through pore 15 is firmly bonded by the fused product 16 of a component contained in at least one (in this example, all of three) of the front surface layer 12, the back surface layer 13, and the back cloth 14. Examples of that method include hot perforation, embossing, and welder processing. Of them, embossing is preferable in terms of process stability and cost. Welder processing is preferable in terms of prevention of unnecessary heat affecting the surface of the seat skin. The method is selected, depending on the purpose.

Embossing may be either roller embossing or plate embossing. In embossing, a multilayer sheet including at least the front surface layer 12 and the back surface layer 13 is passed through an embossing roller (pressing plate 80) having die portions 17 described below and a backing roller (backing plate 81), and is thereby heated and pressed by the embossing roller (pressing plate 80) and the backing roller (backing plate 81), so that the through pores 15 are formed.

<Method for Producing Seat Skin>

Next, a method for producing the seat skin 11 including the front surface layer 12 formed of a polyester woven fabric subjected to napping or buffing, the back surface layer 13 formed of a polyurethane foam sheet, and the back cloth 14 formed of a polyester knitted fabric, by means of embossing (plate embossing), will be described. Note that the materials for the front surface layer 12, the back surface layer 13, and the back cloth 14 described for this production method are merely for illustrative purposes. The present invention is not limited to these materials. The back cloth 14 may not be used.

FIG. 2 is a diagram for describing a method for producing the seat skin of the first embodiment of the present invention. FIG. 2(*a*) is a diagram illustrating an example of a base material formation step. FIG. 2(*a'*) is a diagram illustrating another example of the base material formation step. FIG. 2(*b*) is a diagram illustrating a sandwiching step. FIG. 2(*c*) is a diagram illustrating a pressing step. FIG. 2(*d*) is a diagram illustrating a discharging step.

[Base Material Formation Step]

Initially, as illustrated in FIG. 2(*a*), a polyester woven fabric sheet that is to form the front surface layer 12 is unrolled and fed from a first drum 91, and a polyurethane foam sheet that is to form the back surface layer 13 is unrolled and fed from a second drum 92. A surface of the polyurethane foam sheet is heated by a heating means (in this example, a burner 93 is illustrated). The polyester woven fabric sheet and the polyurethane foam sheet are sandwiched and transferred downstream by a pair of pinch rollers 94 and 95 such that the polyester woven fabric sheet is attached to the melted surface of the polyurethane foam sheet. The two-layer sheet (multilayer sheet) in which the polyester woven fabric sheet and the polyurethane foam sheet are put and fused on top of each other is wound into a roll by a winding roller 96. The winding roller 96, around which the two-layer sheet has been wound, is set as a second drum 92. A polyester knitted fabric sheet that is to form the back cloth 14 is set on the first drum 91. Thereafter, the polyester knitted fabric sheet is unrolled and fed from the first drum 91 while the two-layer sheet is unrolled and fed from the second drum 92. A surface of the polyurethane foam sheet of the two-layer sheet is heated by a heating means. The polyester knitted fabric sheet and the two-layer sheet are sandwiched and transferred downstream by the pair of pinch rollers 94 and 95 such that the polyester knitted fabric sheet is attached to the melted surface of the polyurethane foam sheet. The resultant three-layer sheet in which the polyester woven fabric sheet, the polyurethane foam sheet, and the polyester knitted fabric sheet are put and fused on top of each other is wound as a base material 70 for a seat skin by a winding roller 96.

Another example of the base material formation step is illustrated in FIG. 2(*a'*). As illustrated in FIG. 2(*a'*), a polyurethane foam sheet that is to form the back surface layer is unrolled and fed from a first drum (not illustrated), and a polyester knitted fabric sheet that is to form the back cloth 14 is unrolled and fed from a second drum (not illustrated). A surface of the polyurethane foam sheet is heated by a heating means (burner 93). The polyurethane foam sheet and the polyester knitted fabric sheet are sandwiched and transferred downstream by pinch rollers 97 and 98 such that the polyester knitted fabric sheet is attached to the melted surface of the polyurethane foam sheet. A surface of the polyurethane foam sheet in the two-layer sheet (multilayer sheet) in which the polyester knitted fabric sheet and the polyurethane foam sheet are put and fused on top of each other is heated by a heating means (burner 93'). The two-layer sheet and a polyester woven fabric sheet that is to form the front surface layer 12 and is unrolled and fed from a third drum (not illustrated) are sandwiched and transferred downstream by the pinch roller 98 and a pinch roller 99 such that the polyester woven fabric sheet is attached to the melted surface of the polyurethane foam sheet. The resultant three-layer sheet in which the polyester woven fabric sheet, the polyurethane foam sheet, and the polyester knitted fabric sheet are put and fused on top of each other is wound as a base material 70 for a seat skin by a winding roller (not illustrated).

[Sandwiching Step]

Next, as illustrated in FIG. 2(*b*), the base material 70 formed by the base material formation step is sandwiched between the pressing plate 80 in which the die portions 17 for forming the through pores 15 are provided in an upright position on a base plate 18, and the backing plate 81 which is opposite the pressing plate 80. At that time, preferably, a protective sheet 82 is previously placed on the backing plate 81 such that the protective sheet 82 is inserted between the base material 70 and the backing plate 81.

Here, the shape of the die portion 17 is not particularly limited, and may be a desired shape. Preferably, the die portion 17 is in the shape of a frustum because the through pore 15 can be easily formed. For a similar reason, the die portion 17 preferably has a circular top face. More preferably, the top face excluding a periphery of the die portion 17 (i.e., an inner portion of the top face) is recessed. The top face of the die portion 17 may be an oblique face (the shape of a cross-section of a single-edged blade). This allows the die portion 17 to easily penetrate into the base material 70, so that the through pore 15 can be easily formed. The die portion 17 may also be shaped such that a pin for punching is further provided on the top face of the die portion 17. By providing the pin, the through pore 15 can be easily formed. Furthermore, the die portion 17 is penetrated into the base material 70 in a thickness direction in the pressing step described below, and therefore, the inner wall of the through pore 15 can be easily formed of the front surface layer 12 made of a polyester woven fabric sheet.

The shape of the backing plate 81 used in embossing may be a flat smooth plate, or may have recessed portions corresponding to the die portions 17 (so-called male and female die). The shapes of the pressing plate 80 and the backing plate 81 may be an appropriate combination of the shapes described above.

The protective sheet 82 is provided in order to prevent damage to the die portions 17, efficiently remove punching pieces (not illustrated) during formation of the through pores 15, and facilitate formation of the through pores 15. The protective sheet 82 is not particularly limited. Examples of the protective sheet 82 include paper, films, woven fabrics, knitted fabrics, and nonwoven fabrics. Of them, woven fabrics, knitted fabrics, and nonwoven fabrics, particularly woven fabrics, knitted fabrics, and nonwoven fabrics that are made of fibers having a low melting point, are preferable because punching pieces can be efficiently removed. Paper is preferable because the through pores 15 can be easily formed.

[Pressing Step]

Figure 2A:
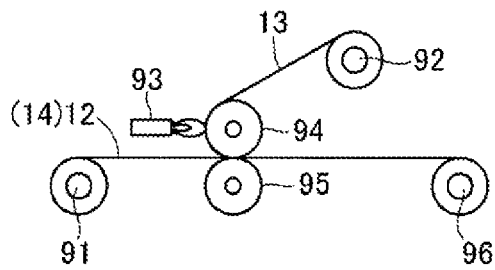
FIG. 2(a) is a diagram illustrating an example of a base material formation step.
Figure 2A:
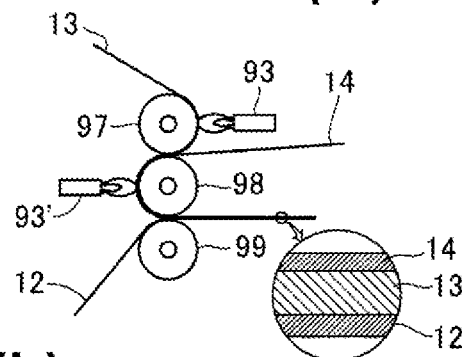
Figure 2B:
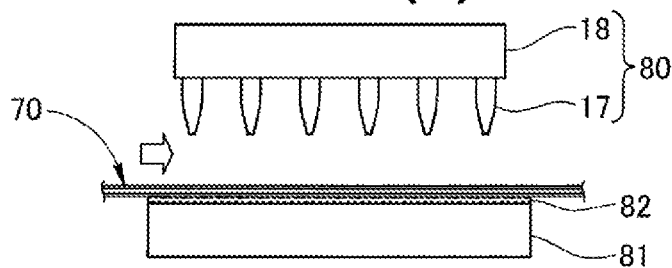
FIG. 2(b) is a diagram illustrating a sandwiching step.
Figure 2C:
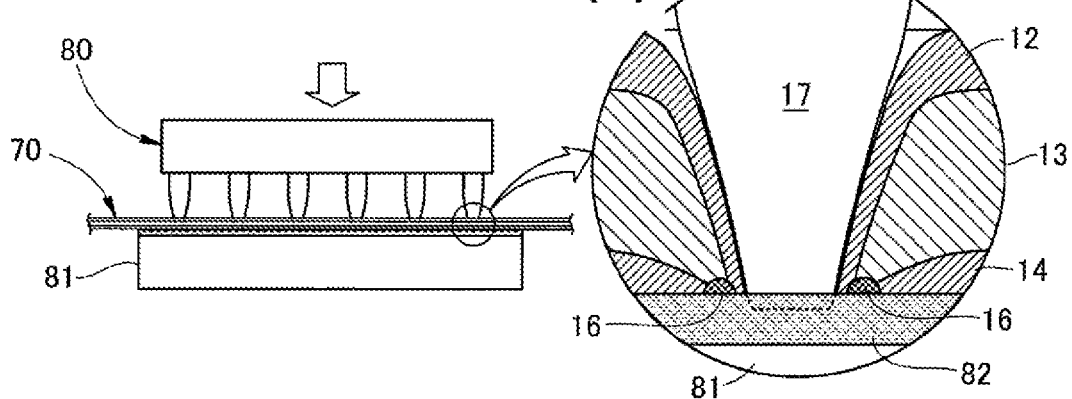
FIG. 2(c) is a diagram illustrating a pressing step.

Next, as illustrated in FIG. 2(c), the pressing plate 80 is relatively moved toward the backing plate 81 with the backing plate 81 being heated using a resistance wire (not illustrated) at a temperature that the polyester woven fabric sheet included in the front surface layer 12 does not melt, so that the die portions 17 of the pressing plate 80 are pressed against the backing plate 81, and the through pores 15 are formed in the base material 70. Note that the polyurethane foam sheet included in the back surface layer 13 is more easily softened by heat than the polyester woven fabric sheet included in the front surface layer 12. Therefore, in the seat skin 11, as illustrated in FIGS. 1 and 2(d), the back cloth 14 is pulled up together with the back surface layer 13 toward the front surface layer 12, and therefore, the back surface of the seat skin 11 is bent into an upward arc shape (this also holds true of second to seventh embodiments illustrated in FIGS. 3-8 described below).

[Discharging Step]

Figure 2D:
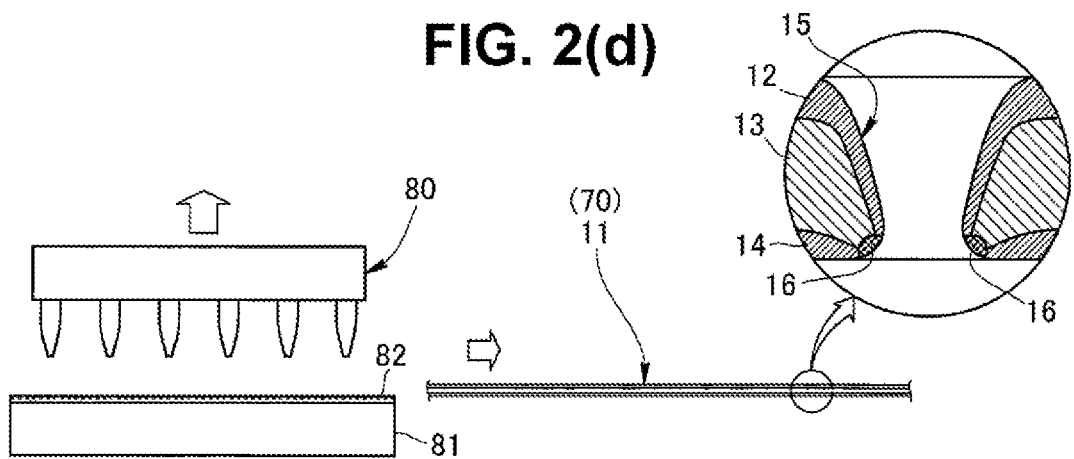
FIG. 2(d) is a diagram illustrating a discharging step.

Next, as illustrated in FIG. 2(d), the pressing plate 80 is relatively moved such that the pressing plate 80 is pulled away from the backing plate 81, and the base material 70 having the through pores 15 formed therein is removed from between the pressing plate 80 and the backing plate 81. Thus, the seat skin 11 having the through pores 15 can be produced.

In the seat skin 11 produced by the above production method, the through pores 15 are formed, extending from the front surface layer 12 toward the back surface layer 13. Therefore, air permeability can be significantly improved, so that when the seat skin 11 is used as a skin of a seat, a stuffy feeling can be reliably reduced by the through pores 15 provided in the seat skin 11. In addition, in the seat skin 11 produced by the above production method, the inner wall of the through pore 15 is covered by the front surface layer 12 itself. Therefore, the front surface layer 12 around the through pore 15 and the inner wall of the through pore 15 can have the same texture, and in addition, the portion at which the through pore 15 is provided can provide depth as a design feature, resulting in good design properties.

Second Embodiment

Figure 3:
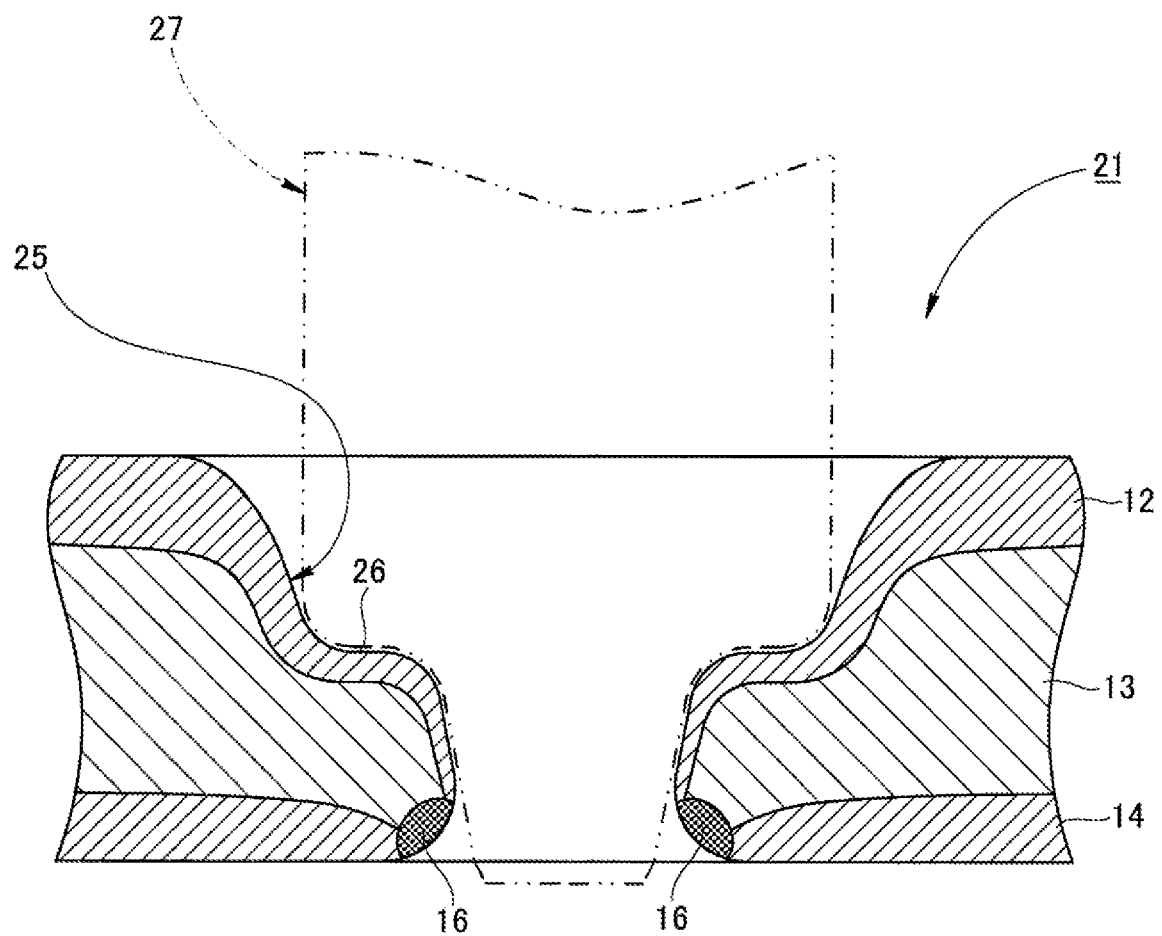
FIG. 3 is a cross-sectional view schematically illustrating a multilayer structure of a seat skin according to a second embodiment of the present invention.

FIG. 3 is a cross-sectional view schematically illustrating a multilayer structure of a seat skin according to a second embodiment of the present invention. In the second embodiment, parts that are similar to or the same as those of the first embodiment are indicated by the same reference characters and will not be described in detail. In the description that follows, parts peculiar to the second embodiment will be mainly described (this also holds true of third to seventh embodiments described below).

In a seat skin 21 according to the second embodiment illustrated in FIG. 3, the inner wall of a through pore 25 has an annular step surface 26 that is formed in between the front surface layer 12 and the back surface layer 13. The pore diameter of the through pore 25 sharply changes at the step surface 26, i.e., the pore diameter of a portion thereof above the step surface 26 is significantly different from the pore diameter below the step surface 26.

The seat skin 21 of the second embodiment can, of course, have an effect similar to that of the seat skin 11 of the first embodiment, and in addition, can provide depth as a design feature. Although only one step surface 26 is provided on the inner wall of the through pore 25 in this example, a plurality of step surfaces 26 may be provided such that the through pore 25 has a significant change in pore diameter at multiple steps, i.e., at different depths.

The method for producing the seat skin 21 of the second embodiment is the same as the method for producing the seat skin 11 of the first embodiment, except that die portions 27 having a step portion for forming the step surface 26 are used instead of the die portions 17 used in the method for producing the seat skin 11 of the first embodiment.

Third Embodiment

Figure 4:
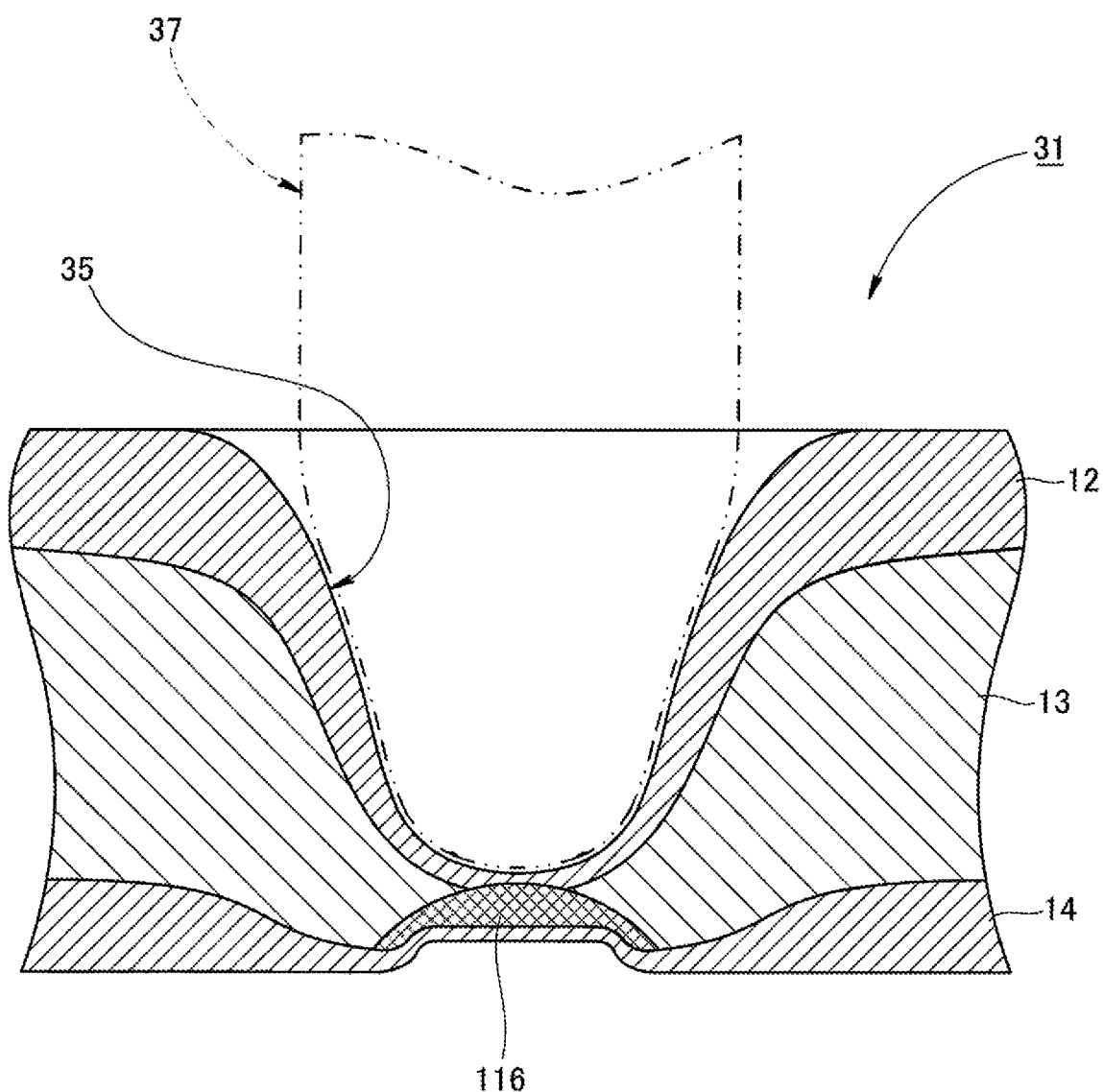
FIG. 4 is a cross-sectional view schematically illustrating a multilayer structure of a seat skin according to a third embodiment of the present invention.

FIG. 4 is a cross-sectional view schematically illustrating a multilayer structure of a seat skin according to a third embodiment of the present invention. In the seat skin 31 of the third embodiment illustrated in FIG. 4, recessed pores 35 (corresponding to "pores" of the present invention) are formed, extending from the front surface layer toward the back surface layer 13. The inner wall of the recessed pore 35 is covered by the front surface layer 12 itself. Specifically, unlike the artificial leather of Patent Document 1 in which the inner wall of the through pore is covered by a thermally-melted material, the inner wall of the recessed pore 35 is covered only by the front surface layer 12. In addition, the bottom surface of the recessed pore 35 is formed at a position deeper than that of the connection surface of the back surface layer 13. As a result, the seat skin 31 is soft and flexible and therefore has good texture, and is easy to fit the body. Note that in the seat skin 31, the back cloth 14 does not melt during formation of the recessed pore 35. Therefore, the front surface layer 12 and the back surface layer 13 are bonded together, below the bottom of the recessed pore 35, by a fused product 116 of a component contained in the front surface layer 12 and/or the back surface layer 13 (in this example, both of the front surface layer 12 and the back surface layer 13).

The method for producing the seat skin 31 of the third embodiment is the same as the method for producing the seat skin 11 of the first embodiment, except that die portions 37 having a rounded tip portion for forming the recessed pore 35 are used instead of the die portions 17 used in the method for producing the seat skin 11 of the first embodiment.

In the seat skin 31 of the third embodiment, the recessed pore 35 is formed, extending from the front surface layer 12 toward the back surface layer 13. Therefore, when the seat skin 31 is used as a skin of a seat, a stuffy feeling can be reduced by the recessed pores 35 provided in the seat skin 31. In addition, the inner wall of the recessed pore 35 is covered by the front surface layer 12 itself. Therefore, the front surface layer 12 around the recessed pore 35 and the inner wall of the recessed pore 35 can have the same texture, and in addition, the portion at which the recessed pore 35 is provided can provide depth as a design feature, resulting in good design properties.

Fourth Embodiment

Figure 5:
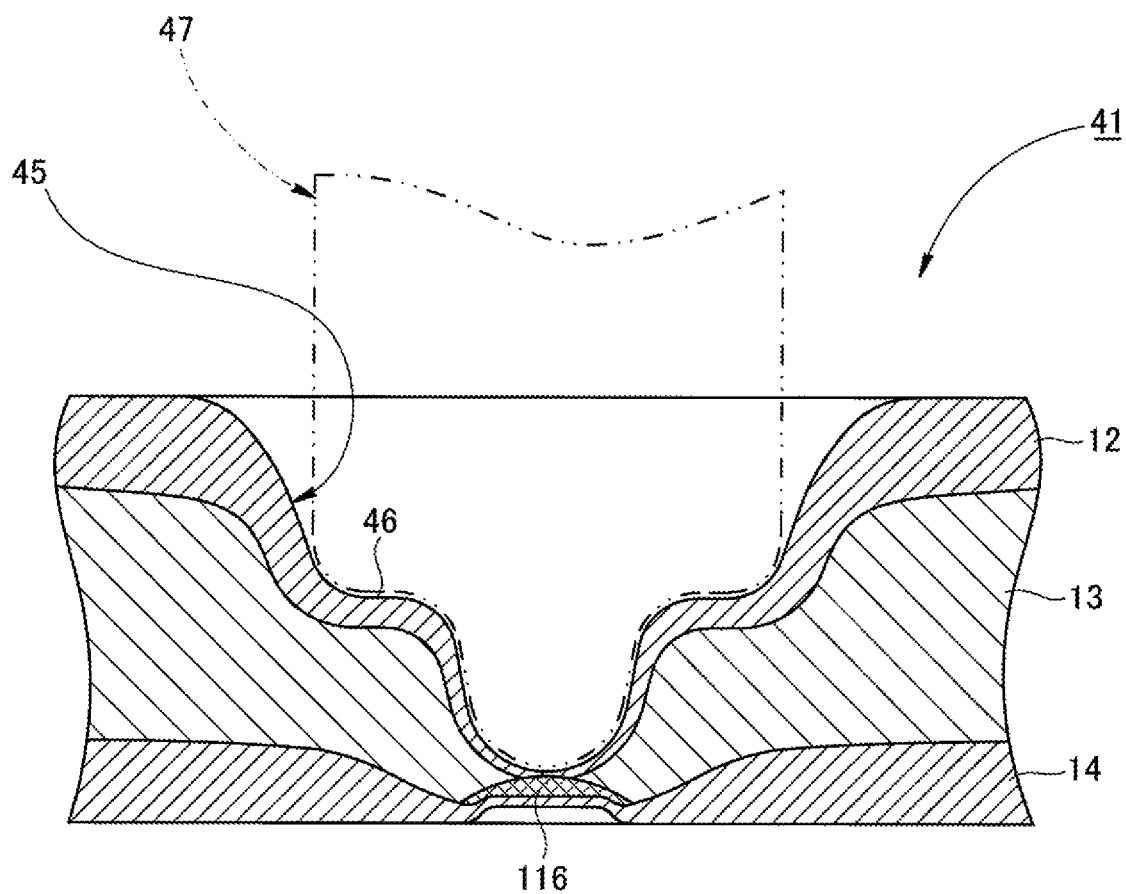
FIG. 5 is a cross-sectional view schematically illustrating a multilayer structure of a seat skin according to a fourth embodiment of the present invention.
Figure 6A:
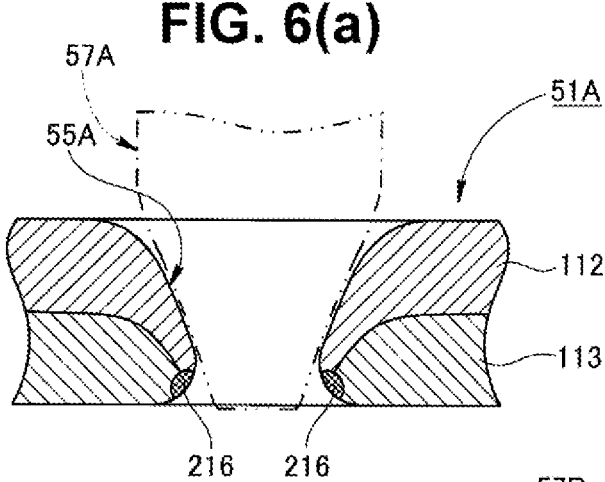
FIG. 6(a) illustrates the case where the pore is a through pore.
Figure 6B:
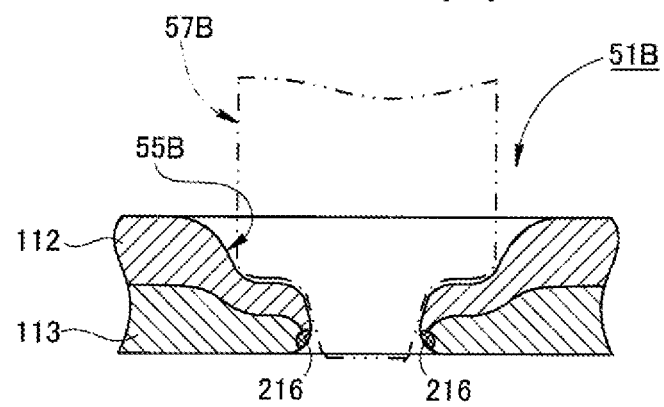
FIG. 6(b) illustrates the case where the pore is a through pore with a step.
Figure 6C:
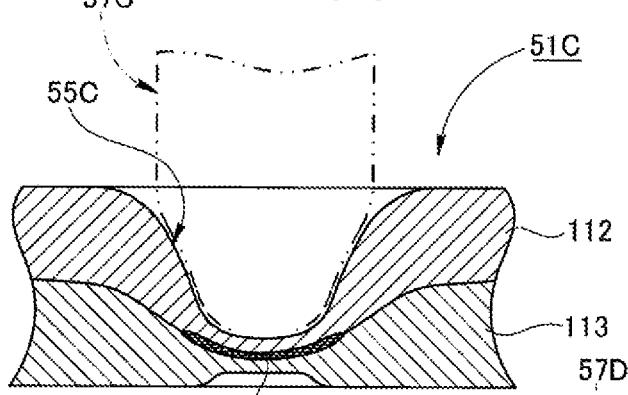
FIG. 6(c) illustrates the case where the pore is a recessed pore.
Figure 6D:
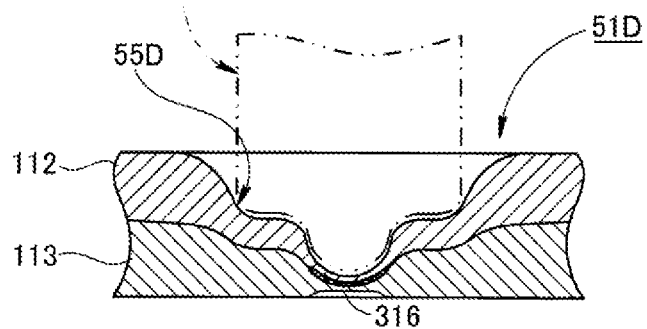
FIG. 6(d) illustrates the case where the pore is a recessed pore with a step.
Figure 7A:
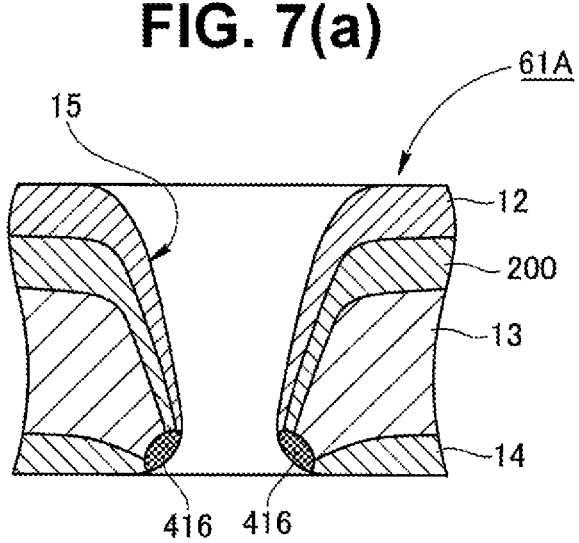
FIG. 7(a) illustrates the case where the pore is a through pore.
Figure 7B:
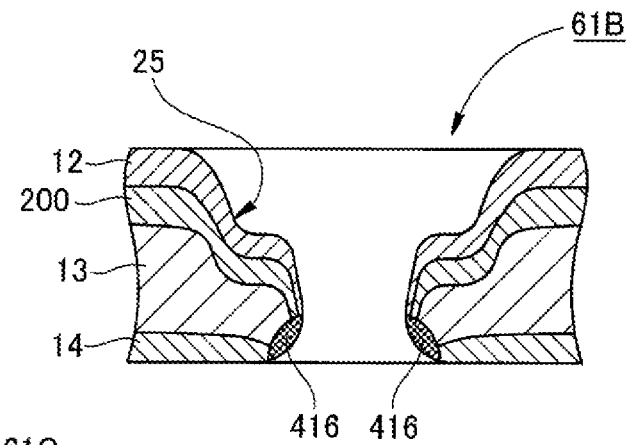
FIG. 7(b) illustrates the case where the pore is a through pore with a step.
Figure 7C:
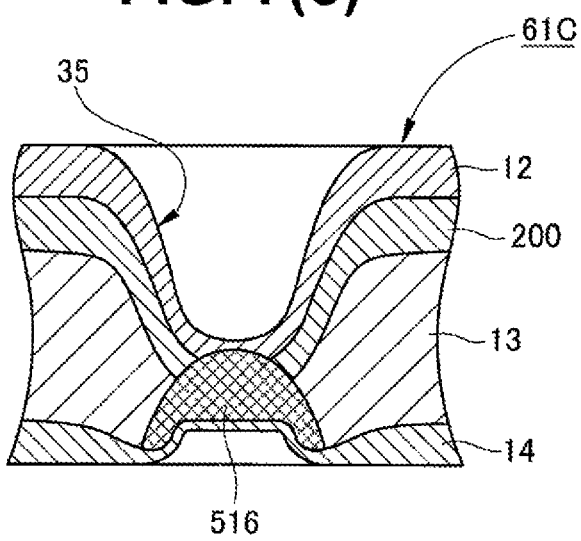
FIG. 7(c) illustrates the case where the pore is a recessed pore.
Figure 7D:
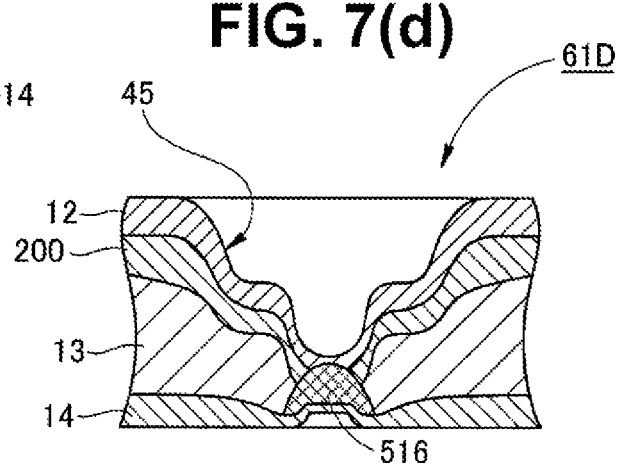
FIG. 7(d) illustrates the case where the pore is a recessed pore with a step.

FIG. 5 is a cross-sectional view schematically illustrating a multilayer structure of a seat skin according to a fourth embodiment of the present invention. In the seat skin 41 of the fourth embodiment illustrated in FIG. 5, the inner wall of a recessed pore 45 has an annular step surface 46 that is formed in between the front surface layer 12 and the back surface layer 13. The pore diameter of the recessed pore 45 sharply changes at the step surface 46, i.e., the pore diameter of a portion thereof above the step surface 46 is significantly different from the pore diameter below the step surface 46. Note that in the seat skin 41, the back cloth 14 does not melt during formation of the recessed pore 45. Therefore, the front surface layer 12 and the back surface layer 13 are bonded together, below the bottom of the recessed pore 45, by a fused product 116 of a component contained in the front surface layer 12 and/or the back surface layer 13 (in this example, both of the front surface layer 12 and the back surface layer 13).

The seat skin 41 of the fourth embodiment can, of course, have an effect similar to that of the seat skin 31 of the third embodiment, and in addition, the depth can be accented in design. Although only one step surface 46 is provided on the inner wall of the recessed pore 45 in this example, a plurality of step surfaces 46 may be provided such that the through pore 45 has a significant change in pore diameter at multiple steps, i.e., at different depths.

The method for producing the seat skin 41 of the fourth embodiment is the same as the method for producing the seat skin 11 of the first embodiment, except that die portions 47 having a rounded tip portion for forming the recessed pore 45 and having a step portion for forming the step surface 46 are used instead of the die portions 17 used in the method for producing the seat skin 11 of the first embodiment.

Fifth Embodiment

FIG. 6 is a cross-sectional view schematically illustrating a multilayer structure of a seat skin according to a fifth embodiment of the present invention. FIG. 6(a) illustrates the case where the pore is a through pore. FIG. 6(b) illustrates the case where the pore is a through pore with a step. FIG. 6(c) illustrates the case where the pore is a recessed pore. FIG. 6(d) illustrates the case where the pore is a recessed pore with a step. As illustrated in FIGS. 6(a)-6(d), seat skins 51A-51D according to the fifth embodiment include a double raschel warp knitted fabric obtained by twining connection threads (not illustrated) knitted into a front surface layer (front surface structure) 112 and connection threads knitted into a back surface layer (back surface structure) 113 and thereby connecting the front surface layer 112 and the back surface layer 113. In these seat skins 51A-51D, through pores 55A (see FIG. 6(a)), through pores 55B with a step (see FIG. 6(b)), recessed pores 55C (see FIG. 6(c)), and recessed pores 55D with a step (see FIG. 6(d)) are formed, extending from the front surface layer 112 toward the back surface layer 113. Note that in the seat skin 51A, 51B, the opening peripheral portion of the through pore 55A, 55B in the back surface layer 113 is bonded by a fused product 216 of a component contained in at least one (in this example, all of three) of the front surface layer 112, the back surface layer 113, and the connection thread. In the seat skin 51C, 51D, the front surface layer 112 and the back surface layer 113 are bonded together, below the bottom of the recessed pore 55C, 55D, by a fused product 316 of a component contained in at least one (in this example, the connection thread) of the front surface layer 112, the back surface layer 113, and the connection thread.

In the seat skins 51A-51D of the fifth embodiment, the through pores 55A and 55B and the recessed pores 55C and 55D are formed, extending from the front surface layer 112 toward the back surface layer 113. Therefore, air permeability can be improved, so that when the seat skins 51A-51D are used as a skin of a seat, a stuffy feeling can be reduced by the through pores 55A and 55B and the recessed pores 55C and 55D included in the seat skins 51A-51D. In addition, the inner wall of each of the through pores 55A and 55B and the recessed pores 55C and 55D is covered by the front surface layer 112 itself. Therefore, the front surface layer 112 around the through pores 55A and 55B and the recessed pores 55C and 55D and the inner wall of the through pores 55A and 55B and the recessed pores 55C and 55D can have the same texture, and the portion at which the through pores 55A and 55B and the recessed pores 55C and 55D are provided can provide depth as a design feature, resulting in good design properties.

The method for producing the seat skins 51A-51D of the fifth embodiment is the same as the method for producing the seat skin 11 of the first embodiment, except that die portions 57A-57D having a shape or the like suitable for formation of the through pores 55A and 55B and the recessed pores 55C and 55D are used instead of the die portions 17 used in the method for producing the seat skin 11 of the first embodiment.

Sixth Embodiment

FIG. 7 is a diagram for describing a seat skin according to a sixth embodiment of the present invention. Seat skins 61A, 61B, 61C, and 61D illustrated in FIGS. 7(a)-7(d) are the seat skins 11, 21, 31, and 41 of the first to fourth embodiments in which an intermediate layer 200 is provided between the front surface layer 12 and the back surface layer 13. Thus, by providing the intermediate layer 200, a heavy and thick feeling can be imparted to the seat skins. Examples of the intermediate layer 200 include cloths, such as woven fabric, knitted fabric, and nonwoven fabric, and synthetic resin foams, such as polyurethane foam. Note that in the seat skin 61A, 61B, the opening peripheral portion of the through pore 15, 25 in the back surface layer 13 is bonded by a fused product 416 of a component contained in at least one (in this example, all of four) of the front surface layer 12, the intermediate layer 200, the back surface layer 13, and the back cloth 14. In the seat skin 61C, 61D, the back cloth 14 does not melt during formation of the recessed pore 35, 45. Therefore, the front surface layer 12, the intermediate layer 200, and the back surface layer 13 are bonded together, below the bottom of the recessed pore 35, 45, by a fused product 516 of a component contained in at least one (in this example, all of three) of the front surface layer 12, the intermediate layer 200, and the back surface layer 13.

Although in the first to sixth embodiments, pores (through pores, recessed pores) are formed, extending from the front surface layer 12 toward the back surface layer 13, the present invention is not limited to this. In some embodiments, pores (through pores, recessed pores) may be formed, extending from the back surface layer 13 toward the front surface layer 12.

Seventh Embodiment

Figure 8:
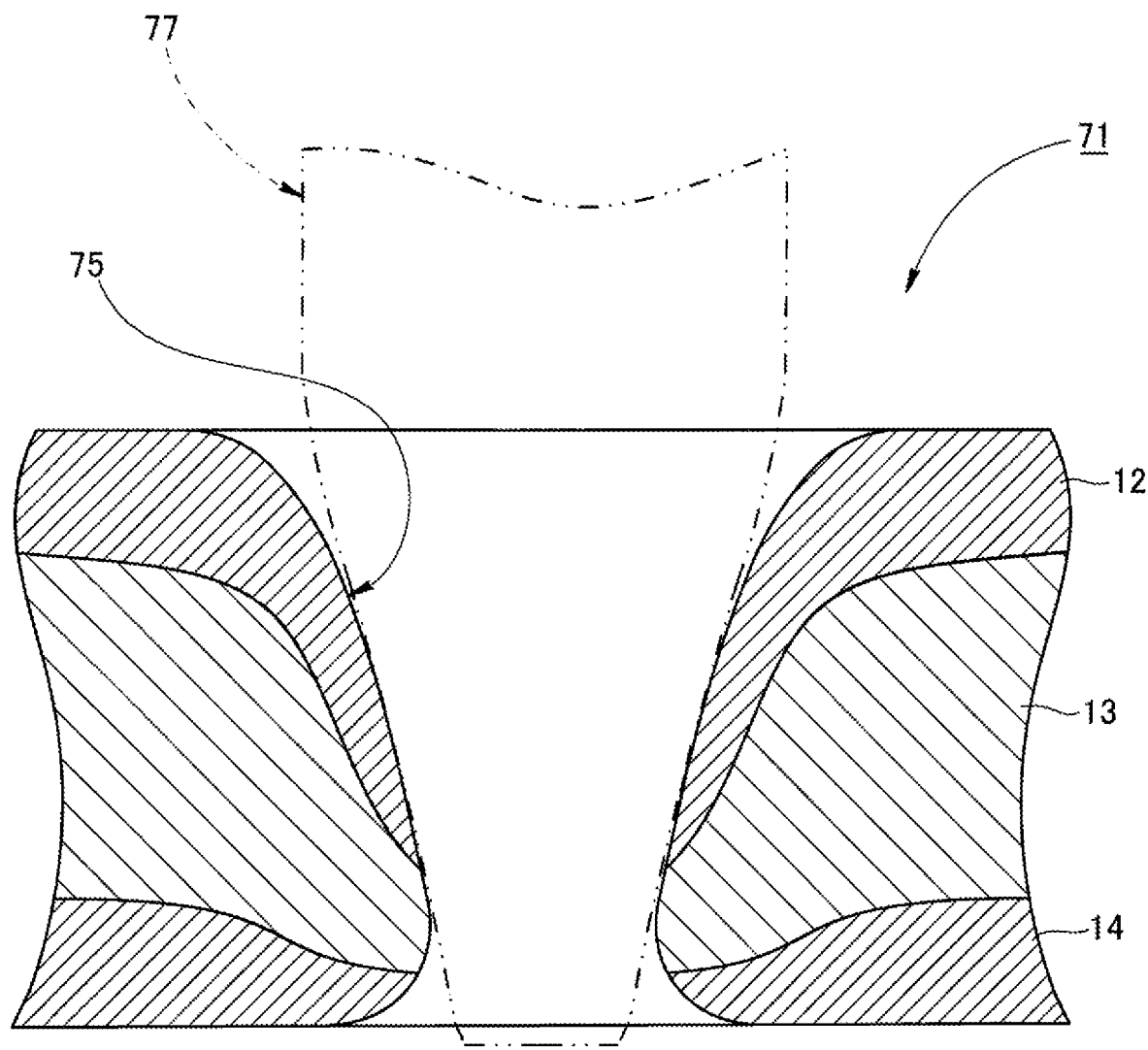
FIG. 8 is a cross-sectional view schematically illustrating a multilayer structure of a seat skin according to a seventh embodiment of the present invention.

FIG. 8 is a cross-sectional view schematically illustrating a multilayer structure of a seat skin according to a seventh embodiment of the present invention. In the seat skin 71 of the seventh embodiment illustrated in FIG. 8, the inner wall of a through pore 75 has not only a portion covered by the front surface layer 12, but also a portion where the back surface layer 13, the back cloth 14, and the like are exposed. Such a structure is created when pores are produced from the back surface, or when conditions for heating and pressing are weakened in order to prevent damage to the front surface layer 12 due to the heating and pressing, for example. In these cases, a fused product of a component contained in the front surface layer 12 and/or the back surface layer 13 is not always produced. In the seat skin 71 of the seventh embodiment, a stuffy feeling can be reduced by the through pores 75 included in the seat skin 71, and design properties and durability can be improved. Note that in production of the seat skin 71 of the seventh embodiment, die portions 77 having a shape suitable for formation of the through pore 75 are used.

In the foregoing, the seat skin of the present invention and the method for producing the seat skin have been described based on a plurality of embodiments. The present invention is not limited to the configurations described in the embodiments described above. The configurations described in the embodiments can be combined, modified, and the like, as appropriate, without departing from the scope and spirit of the present invention. Another specific embodiment will be described below.

Another Embodiment

In the foregoing embodiments, the seat skins 11, 21, 31, 41, 51A-51D, 61A-61D, and 71 are produced by embossing (flat plate embossing) by way of example. Alternatively, the seat skins 11, 21, 31, 41, 51A-51D, 61A-61D, and 71 can be produced by welder processing. Although not illustrated, in welder processing, a base material 70 is passed through a movable surface plate having the die portions 17, 27, 37, 47, 57A-57D attached thereto, and insulating paper on a fixed surface plate, so that the base material 70 is heated and pressed by the die portions 17, 27, 37, 47, 57A-57D with the die portions being heated by high-frequency waves. As a result, the through pores 15, 25, 55A, 55B, or the recessed pores 35, 45, 55C, 55D, are formed. The shapes of the die portions 17, 27, 37, 47, and 57A-57D used in welder processing can be similar to those for embossing. Examples of the insulating paper used in welder processing include silicone sheets, Teflon (registered trademark) sheets, Bakelite plates, and paper. These may be used alone or in combination. Of them, it is preferable to use paper because the through pores 15, 25, 55A, 55B can be easily formed. Note that in welder processing, like embossing, a protective sheet (e.g., a film) may be additionally provided in order to prevent damage to the die portions, efficiently remove punching pieces during formation of the through pores, and facilitate formation of the through pores.

INDUSTRIAL APPLICABILITY

The seat skin of the present invention is useful for, for example, interior materials for vehicles, and covers for chairs.

REFERENCE SIGNS LIST

11, 21, 31, 41 SEAT SKIN
51A-51D SEAT SKIN
61A-61D SEAT SKIN
71 SEAT SKIN
12 FRONT SURFACE LAYER
13 BACK SURFACE LAYER
14 BACK CLOTH
15, 25, 55A, 55B, 75 THROUGH PORE (PORE)
16, 116, 216 FUSED PRODUCT
316, 416, 516 FUSED PRODUCT
17, 27, 57A, 57B, 77 DIE PORTION (PORE DIE)
18 BASE PLATE
26, 46 ANNULAR STEP SURFACE
35, 45, 55C, 55D RECESSED PORE (PORE)
37, 47, 57C, 57D DIE PORTION (PORE DIE)
70 BASE MATERIAL
80 PRESSING PLATE
81 BACKING PLATE
82 PROTECTIVE SHEET
91 FIRST DRUM
92 SECOND DRUM
93, 93' BURNER
94, 95 PINCH ROLLER
96 WINDING ROLLER
97, 98, 99 PINCH ROLLER
112 FRONT SURFACE LAYER (FRONT SURFACE STRUCTURE)
113 BACK SURFACE LAYER (BACK SURFACE STRUCTURE)
200 INTERMEDIATE LAYER

What is claimed is:

1. A seat skin comprising: a front surface layer; a back surface layer; and pores, wherein
   an inner wall of the pore is covered by the front surface layer,
   the pore is a through pore, and only an opening peripheral portion of the through pore in the back surface layer is formed of a fused product of a component contained in the front surface layer and/or the back surface layer, and
   a back surface of the seat skin where the fused product is formed is smoothly bent into an upward arc shape.

2. The seat skin of claim 1, wherein
   a pore diameter of the pore varies according to depth.

3. The seat skin of claim 1, wherein
   an intermediate layer is provided between the front surface layer and the back surface layer.

4. The seat skin of claim 1, wherein
   the back surface layer includes a cushioning material.

5. The seat skin of claim 1, wherein
   a back cloth is provided on a lower surface of the back surface layer.

6. The seat skin of claim 1, wherein
   the front surface layer and the back surface layer simultaneously or independently contain at least one resin selected from the group consisting of polyester resins, polyamide resins, polyacrylic resins, polyolefin resins, polyvinyl chloride resins, and polyurethane resins.

7. The seat skin of claim 1, wherein the front surface layer and the back surface layer are integrated into a multilayer sheet and a thickness of the multilayer sheet is 1.3-30 mm.

\* \* \* \* \*

UNITED STATES PATENT AND TRADEMARK OFFICE
CERTIFICATE OF CORRECTION

| | | |
|---|---|---|
| PATENT NO. | : 11,999,145 B2 | Page 1 of 1 |
| APPLICATION NO. | : 17/755833 | |
| DATED | : June 4, 2024 | |
| INVENTOR(S) | : Naozumi Fuwa | |

It is certified that error appears in the above-identified patent and that said Letters Patent is hereby corrected as shown below:

In the Specification

Column 8, Line 14, "layer is unrolled and fed" should be --layer 13 is unrolled and fed--

Signed and Sealed this
Seventeenth Day of December, 2024

Derrick Brent
*Acting Director of the United States Patent and Trademark Office*